United States Patent Office 3,525,620

Patented Aug. 25, 1970

1

3,525,620

PHOTOGRAPHIC LIGHT-SENSITIVE ELEMENT

Fumihiko Nishio, Ikuo Shimizu, Sadaaki Koba, and Nobuo Tsuji, Ashigara-Kamigun, Kanagawa, and Yoshihide Hayakawa, Kita-Adachigun, Saitama, Japan, assignors to Fuiji Shashin Film Kabushiki Kaisha, Ashigara-Kamigun, Kanagawa, Japan No Drawing. Filed Jan. 5, 1967, Ser. No. 607,385
Claims priority, application Japan, Jan. 5, 1966, 41/528
Int. Cl. G03c *1/04*
U.S. Cl. 96—84 10 Claims

ABSTRACT OF THE DISCLOSURE

Emulsion compositions and layers containing additions of (1) an aqueous dispersion of a vinyl polymer, and (2) a polyhydroxy compound.

Vinyl monomer is dispersed in water with the aid of an anionic dispersing agent of the following formula:

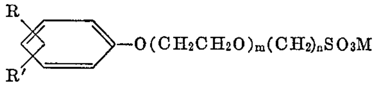

wherein R represents a hydrogen atom or an alkyl group having from 1 to 18 carbon atoms, R′ represents an alkyl group having from 1 to 18 carbon atoms, *m* is 0 or a positive integer of less than 20, *n* is 3 or 4, and M represents an alkali metal or an ammonium radical.

Monomer is then polymerized to form the polymer dispersion. Polymer dispersion and polyhydroxy compound are then added to gelatin containing compositions used to form layers in photographic elements.

BACKGROUND OF THE INVENTION

Various properties have been defined for silver halide emulsion layers used in photographic films and in litho-films for the photographic printing industry and the highest qualities are required. That is, the films must meet particularly severe physical properties for emulsion layers, such as scratch strength, surface hardness, dimensional stability of the film to humidity and heat, adhesion between the photographic emulsion layer and a film base, and photographic properties.

However, emulsion layers for conventionally available litho-film do not always meet these requirements or satisfy them partially. In particular, since very high qualities are required recently, various efforts have been made to satisfy the above-mentioned characteristics and various additives have been incorporated for each purpose. See, for example, Japanese Pat. 1,718/64, British Patent 939,-360, U.S. Pat. 2,461,023, etc. However, as there is an increase in the kinds and amounts of additives for improving the various photographic properties, the physical properties of gelatin emulsion films are frequently reduced.

In particular, when a water-soluble, high molecular material or other materials incompatible with gelatin are incorporated in a gelatin emulsion, or the amount of gelatin is kept relatively low to improve the photographic characteristics, the gelatin film is markedly reduced in scratch hardness and the surface hardness. However, properties other than scratch hardness and surface hardness of the gelatin layer must frequently be improved and these physical properties also are inevitably sacrificed.

As is well known, light-sensitive elements for printing are usually processed under severe conditions. Thus, if a gelatin film having excellent physical properties is obtained, the photographic properties of a light-sensitive element containing such a gelatin film are frequently inadequate. Or, if the photographic properties are good, the physical properties of the gelatin layer are inadequate. Hence, the properties of such light-sensitive elements are not always satisfactory in spite of various efforts to improve them.

2

An object of the present invention is to provide a photographic light-sensitive element having good photographic properties and comprising a support provided with a layer formed by a gelatin coating having very excellent physical properties.

That is, the object of the present invention is to provide a photographic light-sensitive element having sufficiently high scratch hardness, high surface hardness, good flexibility, and good dimensional stability to humidity and heat together with good photographic properties such as good photographic contract, half tone dot quality, and exposure and development latitude.

SUMMARY OF THE INVENTION

The present invention comprises incorporating in a photographic layer of a photographic gelatino silver halide light-sensitive element, (1) a polymeric aqueous dispersion of a vinyl polymer dispersed by an anionic dispersing agent represented by the following Formula I

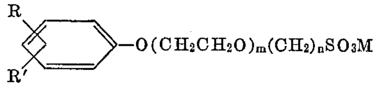

(I)

wherein R represents a hydrogen atom or an alkyl group having from 1 to 18 carbon atoms, R′ represents an alkyl group having from 1 to 18 carbon atoms, *m* is 0 or a positive integer of less than 20, *n* is 3 or 4, and M represents an alkali metal or an ammonium radical, and (2) a polyhydroxy compound, represented by the following Formula II

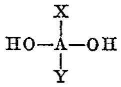

(II)

wherein A represents a tetra-valent aliphatic hydrocarbon group having from 4 to 10 carbon atoms, and X and Y each represents a hydrogen atom or hydroxyl group.

The above-mentioned aqueous vinyl polymer dispersion and the polyhydroxy compound may most effectively be incorporated in an emulsion layer but may also be incorporated in a protective layer, an anti-halation layer, or back layer.

DESCRIPTION OF PREFERRED EMBODIMENTS

Typical examples of dispersing agents shown by Formula I are as follows:

Compound 1

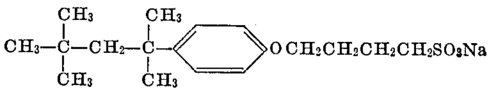

Compound 2

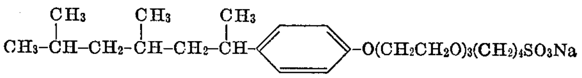

Compound 3

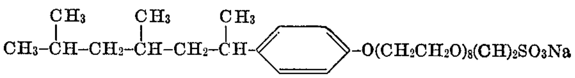

Compound 4

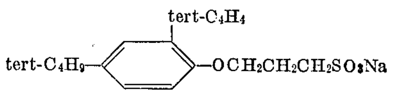

Compound 5

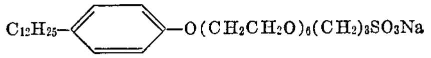

Compound 6

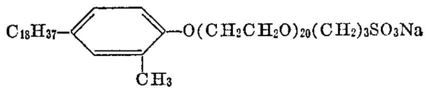

In the above examples, only sodium salts are illustrated but potassium salts and ammonium salts can also be used in the present invention. Preparation methods for such dispersing agents are described in Belgian Pat. 650,004.

Aqueous solutions of these dispersing agents are very stable as compared with those of other dispersing agents. Moreover, the aqueous polymer dispersion can be very easily dispersed in a gelatin silver halide emulsion and hence the properties of the emulsion layer obtained from the dispersion mixture are excellent.

Furthermore, the aqueous dispersion of a vinyl polymer prepared by using the above-mentioned dispersing agent has merit in that it does not adversely influence the photographic properties of the silver halide emulsion layer, and it improves the properties of litho-film. In the case of using an aqueous dispersion of a vinyl polymer prepared by using a conventional dispersing agent for improving the edge gradient of a lithographic film, it sometimes acts harmfully and completely loses its ability to improve the edge gradient. See, for example, Japanese Patent 23,466/65. On the contrary, the aqueous dispersion of a vinyl polymer prepared by using the dispersing agent of this invention is harmless and, in fact, improves the edge gradient. The above-mentioned dispersing agents of this invention may be employed alone or as a mixture thereof, or may be used together with a suitable proportion of other dispersing agents.

There are no particular limitations in the amount of the dispersing agents, but usually the amount of the dispersing agent employed is from 0.1 to 20% by weight, and preferably from 3 to 8% by weight of the vinyl monomer. Other amounts may be used, but if the amount is less than 0.1% by weight, sufficient effect will not be obtained, and if the amount is higher than 20% by weight, no further improvement is obtained.

Suitable vinyl polymer for use in the present invention includes an acrylic ester polymer, a methacrylic ester polymer, an α-substituted acrylic ester polymer, an acrylamide derivative polymer, a methacrylamide derivative polymer, an α-substituted acrylamide derivative polymer, a vinyl ester polymer, a halogenated vinyl polymer, a halogenated vinylidene polymer, a styrene polymer, a styrene derivative polymer, an ethylene polymer, a propylene polymer, a butylene polymer, a butadiene polymer, a vinyl ether polymer, an acrylonitrile polymer, etc. The polymer may be a homo-polymer or may be a copolymer thereof or with another vinyl compound. It is preferable that the amount of the vinyl polymer be from 10–260 g. (as solid) per one gram molecule of silver halide, in case the addition is to a photographic silver halide emulsion, and from 30–150 g. per 60 g. of gelatin in case the addition is to an anti-halation layer, a back layer or a protective layer. If the addition amount of the vinyl polymer is less than the above range, the physical properties of the layer will not be improved sufficiently, and, if the amount is higher than the stated values, the gelatin layer will become turbid and the production thereof will become impossible.

The aqueous dispersion of the vinyl polymer of the present invention may be prepared by dispersing a vinyl monomer for the above-mentioned vinyl polymer in water. The water may be about 4 to 10 times the amount of the vinyl monomer. There is used from 0.1 to 20% by weight, based on the weight of the vinyl monomer, of the above-mentioned dispesring agent shown by the Formula I. If necessary, there may be introduced additives necessary for the emulsion polymerization of the vinyl monomer, a polymerization initiator, such as hydrogen peroxide or potassium persulfate, etc. Then the emulsion polymerization is carried out in a conventional manner. Various vinyl polymers, as shown above, may be employed in this invention. An acrylic ester homo-polymer, a methacrylic ester homo-polymer, and copolymers thereof are particularly preferable. In general, a vinyl polymer insoluble in water and having a comparatively low modulas of elasticity is desirable and to produce this, an acrylic ester monomer or a methacrylic higher ester monomer is preferable. Moreover, in order to improve the compatibility of the aqueous vinyl polymer dispersion with a gelatino silver halide emulsion, the emulsion polymerization may be conducted in a system containing a suitable proportion of a water-soluble polymer, such as gelatin, polyvinyl alcohol or polyacrylamide.

In order to maintain the desired transparency, after development of the emulsion layer prepared by applying a mixture of the aqueous vinyl polymer dispersion and a gelatino silver halide emulsion on a support, followed by drying. Attention must be paid to see that the particle size of vinyl polymer in the aqueous dispersion is not increased. A desirable vinyl polymer dispersion can be easily obtained by adjusting the concentration of the surface active agent, the monomer concentration, the stirring rate, the polymerization temperature and other factors as in conventional emulsion polymerization techniques. In general, the particle size of the vinyl polymer in an aqueous dispersion is desirably less than 1 micron and preferably about 0.1 micron.

The polyhydroxy compound suitable for use in the invention includes for example, dihydroxy compounds, such as 1,4-butanediol, 1,5-pentanediol, neopentylglycol, 1,6-hexanediol 1,7-heptanediol, 1,8-octanediol, 1,9-nonanediol, 1,10-decanediol, 1,4-cyclohexane dimenthanol, 2-methyl-2,4-pentanediol, 2,2,4-trimethyl-1,3-pentanediol, 2, 2-diethyl-1, 3 propanediol, 2-ethyl-1, 3-hexanediol, and the like; trihydroxy compounds, such as trimethylolpropane, trimethylolethane, trimethylolbutane, trimethlyolhexane, 1,2,4-butanetriol, 1,2,6-hexanetriol, and the like; and tetrahydroxy compounds such as pentaerythritol, and the like. The preferred amount of the polyhydroxy compound is 5 to 40 g. per one gram molecule of silver halide in the case of addition to a photographic silver halide emulsion, and 5 to 20 g. per 60 g. of gelatin in the case of addition to an anti-halation layer, a back layer or a protective layer.

Other proportions than the stated range are useful, but if the amount is higher than the upper values, sufficient effect is not obtained. If the amount is higher than the stated values, the surface of the light-sensitive element also becomes sticky.

The silver halide emulsion of this invention may be prepared by adding to a ripened silver halide emulsion including photographic emulsions obtained by precipitation methods and other conventional methods, an aqueous dispersion of a vinyl polymer prepared by conventional emulsion polymerization with the dispersing agent shown by the Formula 1 and adding the mixture, preferably with stirring, the polyhydroxy compound.

The photographic silver halide emulsion which may be employed in the present invention, includes for example, silver chloride, silver bromide, silver bromo-chloride, silver bromo-iodide, and silver bromo-iodo chloride emulsions, and the like, but a silver bromo-chloride emulsion is particularly suitable.

The silver halide emulsion may have been chemically sensitized by well known methods, for example, by a compound containing unstable sulfur, such as ammonium thiosulfate or allythiourea (e.g., P. Glafkide's; "Chimie Photographique," the 2nd edition, pages 297–299 (1957), published by Publication Photochinema Paul Montel, Paris), a gold compound such as a complex salt of monovalent gold and thiocyanic acid (ibid., page 301), or the combination thereof. Further, the emulsion may have been optically sensitized by the addition of a dye sensitizer, such as a cyanin dye or a merocyanine dye (e.g., Shinichi Kikuchi; "Kagaku Shashin Binran," pages 15–24 (1959) published by Maruzen K. K.). The emulsion may have been stabilized by a heterocyclic compound such as benzotriazol or 1-phenyl-5-mercaptotetrazol. Furthermore, the emulsion may have been hardened by a hardening agent, such as formaldehyde or mucochloric acid, or may contain a surface active agent, such as saponin for facilitating the coating.

A silver halide emulsion containing the aqueous vinyl polymer dispersion prepared by using the dispersing agent of Formula I of this invention has very good photographic characteristics and comparatively good physical properties, but by the addition of the above-mentioned polyhydroxy compound, the physical properties of the emulsion layer, in particular, the scratch hardness and the surface hardness, are markedly increased, while maintaining the excellent photographic properties. In addition, the dimensional stability to humidity and temperature as well as the flexibility and the shock resistance of the light-sensitive film are improved.

A further advantage accompanying the addition of the additives of the present invention is that the emulsion layer has good adhesion to a film base during processing and after drying. This advantage is particularly important in the case of employing a polyester film having poor adhesion, even if a subbing layer is formed thereon. This means that the light-sensitive element of this invention can endure severe developing processing and other processing. Further, according to the present invention, not only the physical properties of the emulsion film, but also the photographic characteristics are improved. That is, by using the above-stated agent, the vinyl polymer is sufficiently dispersed in a gelatino silver halide emulsion or an aqueous gelatin solution, and a film is obtained which has non-exposed portions which are transparent after development, without lowering the optical properties thereof during processing or after drying. Further, the properties necessary in a printing light-sensitive element, such as relative sensitivity, effective contrast, fogs and half tone dot quality, are the same as or superior to those of conventional materials.

The silver halide emulsion of the present invention is particularly useful as a silver bromo-chloride emulsion for litho-film containing at least 50 mol percent of silver chloride, but it may also be used as emulsions for such films as X-ray film, negative cinefilm, microfilm, portrait film, autoposi film, film for aircraft, facsimile film, industrial copying film, film for astrophotography, and the like. In this case, the scratch hardness, surface hardness, dimensional stability, flexibility, and adhesiveness to the film base are improved together with the photographic properties of the light-sensitive element.

An example for the preparation of the polymeric aqueous dispersion of the vinyl polymer is as follows:

The air inside of a 25 liter glass-lined closed-type reaction vessel having a gas inlet tube and equipped with a temperature adjusting means, an agitator, a reflux condensor, and heating means, was replaced with a nitrogen gas. Into the reaction vessel were charged 12 liters of degassed distilled water and 3 kg. of a vinyl monomer from which a polymerization inhibitor has been removed by distillation. Thereafter, the dispersing agent shown by the Formula I (as shown in the following table) was added to the system and the reaction mixture was emulsified by stirring violently at 500–800 r.p.m. Then 0.15 g. of potassium persulfate as a polymerization initiator and other stabilizers are added and the system was heated to 90–100° C., with stirring. After continuing the reaction for 6 hrs, the polymerization was finished completely. Then, by conducting steam distillation for 1 hour to remove remaining vinyl monomer, the stable polymeric aqueous dispersion of the vinyl polymer was obtained. The site of the particles of the solid vinyl polymer in the dispersion was about 0.1 to 0.5 micron in diameter and almost all of the particles were spherical particles of about 0.2 micron in grain diameter. When a mixture of the thus obtained emulsion and an aqueous gelatin solution was applied to a film and dried, a film having an optically very transparent property was obtained. Thus, the obtained emulsion can be very easily and uniformly dispersed in a gelation silver halide emulsion.

The combinations of the vinyl monomers and the dispersing agents of the Formula I used in preparing polymer dispersions in accordance with the above examples, are shown in the following table.

TABLE 1

| Combination No. | Vinyl monomer | Dispersing agent, amount in g. |
|---|---|---|
| 1 | n-Butylmethacrylate | A (100) |
| 2 | do | B (150) |
| 3 | Ethylacyrylate | C (150) |
| 4 | Methyacrylate | D (150) |
| 5 | Styrene-butadiene (2:1) | E (150) |
| 6 | Vinyl acetate | F (150) |
| 7 | Acrylonitrile | G ( 75) |
| 8 | Methylacrylate vinyl acetate (2:1) | H (100) |
| 9 | Vinyl chloride | J (100) |

The above dispersing agents of this invention are as follows:

Dispersing Agent A=Compound 3, above
Dispersing Agent B=Compound 2, above
Dispersing Agent C=Compound 5, above Dispersing Agent D:

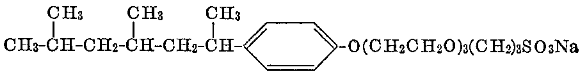

Dispersing Agent E:

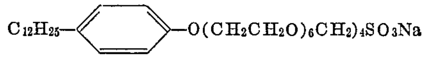

Dispersing Agent F=Compound 4, above
Dispersing Agent G=Compound 6, above
Dispersing Agent H=Compound 5, above
Dispersing Agent J:

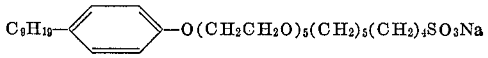

The present invention will then be explained more in detail by the following examples:

EXAMPLE 1

One side of a polyethylene terephthalate film base having gelatin subbing layers on the opposite surfaces was coated with an anti-halation layer containing an anti-halation dye, gelatin and the polymeric aqueous dispersion of butylmethacrylate polymer prepared by the above Combination 2 in Table 1. A ripened silver halide emulsion containing of 4.5% by weight of gelatin, 27 mol percent of AgBr, 73 mol percent of AgCl and a small amount of AgI was mixed with an optical sensitizer, a stabilizer, an antifoggant, and a hardening agent and its mixture was divided into nine equal portions. Each portion was then mixed with the aqueous dispersion of the butylmethacrylate polymer prepared by Combination 1 in Table 1 and trimethylolpropane, in the ratio shown in the following table, per 1 kg. of the emulsion. After stirring thoroughly, the dispersion mixture was applied to the opposite side of the above-mentioned film in a dried thickness of 6.0±0.5 microns. The hardness of the film of thus obtained photographic light-sensitive film during development was tested as follows. The light-sensitive film was developed for 3 minutes in a commercially available hard developer and, while it was immersed in the developer, the surface of the film was scratched by a loaded metallic pin. The weight of the load necessary to cause a scratch on the film surface was measured. After development, the light-sensitive film was fixed for 2 minutes in a conventional hard acidic fixing bath and the same test was conducted in the fixing solution. Further, after fixing, the film was washed with water for 60 minutes and the same test was conducted in water. These results are shown in the following table.

TABLE 2

| Amount of butylmethacrylate, ml. | Amount of methylolpropane, g. | Scratch hardness in liquid (Weight of Load) In developer, g. | In fixing solution, g. | In water, g. |
|---|---|---|---|---|
| 0 | 0 | 35 | 60 | 40 |
| 0 | 10 | 52 | 75 | 54 |
| 0 | 20 | 65 | 80 | 65 |
| 100 | 0 | 50 | 65 | 50 |
| 100 | 10 | 90 | 115 | 96 |
| 100 | 20 | 95 | 120 | 100 |
| 200 | 0 | 65 | 70 | 60 |
| 200 | 10 | 117 | 135 | 120 |
| 200 | 20 | 135 | 150 | 130 |

From the results, it is clear that by the addition of the polymeric aqueous dispersion of the butylmethacrylate polymer or trimethylolpropane into a gelatino silver halide emulsion, the hardness of film in liquid can be increased and the effect is remarkably increased by adding them simultaneously.

The dimensional stability thereof during development and after drying was tested as follows. That is, two holes having 8 mm. in diameter were formed through the sample at an interval of 200 mm. After being allowed to stand for 24 hours in a room at 25° C., and at a relative humidity of 60%, the distance between the two holes was measured accurately by means of a pin gauge of 1/1000 mm. in accuracy. Then, the sample was developed, as in the case of the hardness test, dried by blowing air at a temperature of 50° C., for 1 minute, allowed to stand for 24 hours in a room at 25° C., and 60% RH, and then the distance between the holes was measured. Furthermore, for testing the dimensional change as a result of a change in humidity, the thus developed and dried sample was placed for 6 hours in a room at 25° C. and 30% RH followed by measurement of the distance between the holes, and then was placed for 6 hours in a room at 25° C., and 80% RH followed by measurement of the distance between the holes. The change in length resulting from the processing and drying is divided by the original length 200 mm. and multiplied by 100 to provide the dimensional change percentage. The change of length resulting from the change of humidity is divided by the original length 200 mm. and the difference of the relative humidities, 50% RH to provide the expansion coefficient by humidity. The results are as follows:

TABLE 3

| Amount of polybutylmethacrylate, ml. | Amount of trimethylolpropane, g. | Dimensional change percentage | Expansion coefficient by humidity, $\times 10^{-5}$ |
|---|---|---|---|
| 0 | 0 | 0.035 | 2.73 |
| 0 | 10 | 0.015 | 2.73 |
| 0 | 20 | −0.003 | 2.73 |
| 100 | 0 | 0.028 | 1.55 |
| 100 | 10 | 0.018 | 1.54 |
| 100 | 20 | 0.005 | 1.54 |
| 200 | 0 | 0.025 | 1.47 |
| 200 | 10 | 0.018 | 1.47 |
| 200 | 20 | 0.006 | 1.43 |

From these results, it is clear that the addition of trimethylolpropane increases the dimensional stability at development and drying while the addition of the butylmethacrylate polymer reduces the expansion coefficient by humidity. By using trimethylolpropane and the butylmethacrylate polymer simultaneously, the dimensional stability upon development and drying as well as in response to the change in humidity can be remarkably improved.

Moreover, for measuring the thermal expansion and contraction of the film which is an important problem in printing, the thus developed and dried film was heated for 10 minutes to 70° C. and 10 minutes to 100° C. and thereafter the dimensional change percentage based on the original length of 200 mm., was measured at room temperature. The results are as follows:

TABLE 4

| Amount of polybutylmethacrylate, ml. | Amount of methylolpropane, g. | Heating conditions 70° C. 10 min., dimensional change, percent | 100° C. 10 min., Dimensional change, percent |
|---|---|---|---|
| 0 | 0 | −0.07 | −0.15 |
| 0 | 10 | −0.09 | −0.17 |
| 0 | 20 | −0.10 | −0.18 |
| 100 | 0 | −.04 | −0.09 |
| 100 | 10 | −0.03 | −0.08 |
| 100 | 20 | −0.03 | −0.09 |
| 200 | 0 | −0.02 | −0.07 |
| 200 | 10 | −0.02 | −0.06 |
| 200 | 20 | −0.01 | −0.05 |

Furthermore, in order to estimate the adhesiveness of the gelatin film to the support in a dried state and in an immersion state, the following test was conducted. In a dried state, the surface of the film was scratched by a knife edge. An adhesive tape of a polyethylene terephtalate support was adhered to the surface. The adhesive was stripped suddenly, the extent of the stripped gelatin film adhering the tape was measured. While in an immersion state, the film surface was rubbed by hand and the extent of the stripped gelatin film was measured. For purposes of comparing relative adhesiveness, the sample from which the gelatin film was not stripped is arbitrarily defined as "10". "The sample from which the gelatin film was stripped completely is defined as "1." The ranks between the two limits are divided into 10 grades. The results are shown in the following table.

TABLE 5

| Amount of polybutylmethacrylate, ml. | Amount of trimethylolpropane, g. | Adhesiveness Rating Dry state | Immersion State (a) | (b) | (c) | Dry state after processing |
|---|---|---|---|---|---|---|
| 0 | 0 | 10 | 3 | 3 | 3 | 2 |
| 0 | 10 | 10 | 4 | 4 | 5 | 8 |
| 0 | 20 | 10 | 4 | 5 | 7 | 9 |
| 100 | 0 | 10 | 5 | 4 | 4 | 8 |
| 100 | 10 | 10 | 7 | 7 | 7 | 10 |
| 100 | 20 | 10 | 9 | 8 | 9 | 10 |
| 200 | 0 | 10 | 5 | 5 | 5 | 8 |
| 200 | 10 | 10 | 10 | 10 | 10 | 10 |
| 200 | 20 | 10 | 10 | 10 | 10 | 10 |

From these results, it is clear that trimethylpropane and the butylmethacrylate polymer increase the adhesion between the emulsion layer and the support in the immersion state and in the dry state and the effect is markedly increased if these additives are employed simultaneously. With regard to the photographic properties, the results in the case of incorporating n-butylmethacrylate and trimethylolpropane were almost same as in the case of not incorporatng such materials.

Other experiments were conducted with respect to the photographic properties. The hard silver halide emulsion prepared in Example 1 was mixed with an optical sensitizer, an antifoggant, a stabilizer, a hardening agent and, as an edge gradient increasing agent, 80 mg. per kg. of the emulsion of the compound represented by the formula

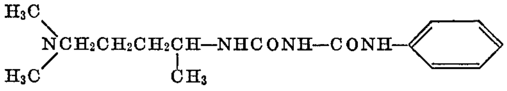

Also added was 40 mg. of an addition product of 1 molecule of nonylphenol and about 50 molecules of ethyleneoxide (cf., e.g., Japanese Patent 23,466/65). Then, the resulting emulsion was divided into five equal portions. The thus divided emulsion was applied to a support in a dry thickness of 6.0±0.5 microns with the addition of the polymeric aqueous dispersion of polybutyl methacrylate prepared by Combination 1 in Table 1 in an amount of 50, 100 or 200 ml. per 1 kg. of the silver halide emulsion. In addition, for comparison, a polymeric aqueous dispersion of butylmethacrylate polymer was prepared as in Combination 1 in Table 1, except that the dispersing agent of this invention was replaced with the conventional dispersing agent shown by the formula,

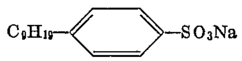

The dispersion was added to a silver halide emulsion in an amount of 100 ml. per 1 kg. of the emulsion and the emulsion was coated on a film base. For measuring the protographic properties of the thus coated film, a sensitometry test and dot quality test were conducted. In the sensitometry test, the film was exposed to a tungsten lamp (2666° K.) through an optical wedge, and then developed in a developer having the following composition:

Warm water—500 ml.
Sodium sulfite (anhydrous)—30 g.
p-Formaldehyde—7.5 g.
Sodium bisulfite—22 g.
Boric acid—7.5 g.
Hydroquinone—22.5 g.
Potassium bromide—1.6 g.
Water to make—1 liter.

In the estimation of dot quality, the same procedure was followed as in the sensitometry test, except that a commercially available magenta contact screen (150 lines) was closely contacted to the surface of the light-sensitive film. The thus formed dot image was observed microscopically. The sharpest dot image was arbitrarily assigned grade A, and from grade A, progressively decreasing sharpness was classified into grades B, C and D. The results are shown in the following table.

TABLE 6

| Aqueous Dispersion Of Polymethylacrylate, ml. | Light-Sensitive Characteristics (Developed for 135 Seconds Sensitometry) Relative humidity | Contrast | Dot Quality At Development, Developing Time 135 sec. | 180 sec. |
|---|---|---|---|---|
| 0 | 100 | 9.0 | A | A |
| 50 | 105 | 8.7 | A | A |
| 100 | 107 | 8.5 | A | B |
| 200 | 110 | 8.4 | A | B |
| 100 [1] | 150 | 5.0 | D | D |

[1] Control example.

From these results it is clear that in the case of using the commercially available dispersing agent of the formula

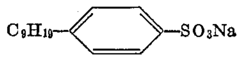

as the dispersing agent for an aqueous dispersion of polybutylmethacrylate, the dot quality at development was extremely reduced, while in the case of using the dispersing agent of this invention, Compound 3, the dot quality was almost the same as that of a conventional film containing no aqueous dispersion of polybutylmethacrylate.

EXAMPLE 2

A silver halide emulsion containing about 4.5% by weight of gelatin, 95 mol percent of AgBr and 5 mol percent of AgI was sufficiently sensitized with a sulfur-containing sensitizer and a gold compound and mixed with an optical sensitizer, an antifoggant, and a hardening agent. The resulting emulsion was divided into four equal portions. Each portion was mixed with 50 g. per 1 kg. of emulsion of the aqueous dispersion of polybutylacrylate prepared as Combination 1 in Table 1 and 10 g. of trimethylolpropane. The thus obtained emulsion was applied to a polyethylene terephthalate film having a subbing layer consisting of a vinyl acetate-maleic anhydride copolymer, in a dry thickness of 15.0±0.5 microns, and dried.

For the thus prepared light-sensitive films, the hardness of the film at immersion, the adhesiveness in the dry state and upon immersion were measured, as in Example 1. The results are as follows:

| Hardness of Film | | | | | Adhesiveness | | | | | |
|---|---|---|---|---|---|---|---|---|---|---|
| Amount of dispersion of polybutylmethacrylate, ml. | Amount of trimethylolpropane, g. | Scratch hardness at immersion (a), g. | (b), g. | (c), g. | Amount of trimethylolpropane, g. | Dry state | Immersion state (a) | (b) | (c) | Dry state after processing |
| 0 | 0 | 25 | 30 | 27 | 0 | 3 | 8 | 7 | 8 | 8 |
| 0 | 10 | 30 | 35 | 32 | 10 | 4 | 8 | 8 | 8 | 8 |
| 50 | 0 | 40 | 50 | 45 | 0 | 7 | 9 | 10 | 9 | 9 |
| 50 | 10 | 65 | 80 | 70 | 10 | 10 | 10 | 10 | 10 | 10 |

(a) in developer; (b) in fixing solution; (c) in washing water.

EXAMPLE 3

A silver iodo-bromide emulsion for aircraft film containing about 4.5% by weight of gelatin, 95 mol percent of AgBr and 5 mol percent of AgI was mixed with an optical sensitizer, an antifoggant, and a hardening agent and the emulsion was divided into four equal portion. Each portion of the emulsion was mixed with 100 ml. of the aqueous dispersion of polyethylacrylate prepared as in Combination 3 in Table 1 and 10 g. of 1,6-hexanediol per 1 kg. of the emulsion. The resulting silver halide emulsion was coated on a polyethylene terephthalate film having a subbing layer, in a dry thickness of 15.0±0.5 microns. For the thus obtained films, the film hardness at immersion, dimensional change by development and drying, and the expansion coefficient with change of humidity were measured as in Example 1. The results are shown in the following table.

EXAMPLE 6

The procedure as in Example 1 was repeated for the combination of the aqueous dispersion of the styrene-butadiene copolymer prepared as in Combination 5 in Table 1 and cyclohexane-1,4-dimethanol. Almost the same results were obtained as in Example 1.

EXAMPLE 7

The procedure as in Example 2 was repeated for the combination of the aqueous dispersion of the vinyl acetate polymer prepared as in Combination 6 in Table 1. Almost the same results were obtained as in Example 2.

| Amount of dispersion of polyethylacrylate, ml. | Film Hardness | | | | Dimensional Change | | |
|---|---|---|---|---|---|---|---|
| | Amount of 1,6-hexanediol, g. | Scratch hardness at immersion (a), g. | (b), g. | (c), g. | Amount of 1,6-hexanediol, g. | Dimensional percentage of 200 ml. by drying percent | Humidity expansion coef at 50% RH $10^{-5}$ |
| 0 | 0 | 45 | 50 | 45 | 0 | 0.030 | 2.5 |
| 0 | 10 | 60 | 65 | 64 | 10 | 0.012 | 2.4 |
| 100 | 0 | 70 | 75 | 72 | 0 | 0.025 | 1.9 |
| 100 | 10 | 115 | 150 | 109 | 10 | 0.016 | 1.8 |

EXAMPLE 4

An antihalation coating solution containing about 6% by weight of gelatin, an antihalation dye and a hardening agent were mixed with 50 ml. of the aqueous dispersion of methyl-acrylate prepared as in Combination 4 in Table 1 and 10 g. of pentaerythritol per 1 kg. of the coating solution. The resulting solution was coated on a cellulose triacetate support having a subbing layer, in a thickness of 9.0±0.5 micorns. For the thus coated films, the same tests as in Example 1 were conducted, the results of which are shown in the following tables.

EXAMPLE 8

The procedure as in Example 1 was repeated using the combination of the aqueous dispersion of the acrylonitrile polymer prepared as in Combination 7 of Table 1. Almost the same results were obtained as in Example 1.

EXAMPLE 9

The procedure, as in Example 2, was repeated using the combination of the aqueous dispersion of the methylacrylate-vinyl acetate copolymer prepared as in Combination 8 of Table 1 and trimethylolethane. The same results were obtained as in Example 2.

| Amount of dispersion of polymethylacrylate, ml. | Film Hardness | | | | Adhesiveness | | | | | |
|---|---|---|---|---|---|---|---|---|---|---|
| | Amount of pentaerythritol, g. | Scratch hardness at immersion (a), g. | (b), g. | (c), g. | Amount of pentaerythritol, g. | Dry state | Immersion state (a) | (b) | (c) | Dry state after processing |
| 0 | 0 | 40 | 55 | 47 | 0 | 10 | 8 | 6 | 8 | 7 |
| 0 | 10 | 50 | 65 | 58 | 10 | 10 | 8 | 8 | 9 | 8 |
| 50 | 0 | 55 | 70 | 60 | 0 | 10 | 9 | 10 | 10 | 10 |
| 50 | 10 | 85 | 130 | 100 | 10 | 10 | 10 | 10 | 10 | 10 |

NOTE:
(a) in developer; (b) in fixing solution; and (c) in washing water.

EXAMPLE 5

An aqueous coating solution containing about 6% of gelatin, 1% of the weight of gelatin of bis(3-methyl-1-(4-sulfophenyl)-pyrazol-5-one)-pentamethinoxonol, as an antihalation dye, and 0.15% of the weight of gelatin of chromium acetate, as a hardening agent, was mixed with 200 ml. of the aqueous dispersion of polybutylmethacrylate prepared as in Combination 2 in Table 1 and 10 g. of trimethylolpropane per 1 kg. of the coating solution. The resulting solution was applied to a polyethylene terephthalate film having a gelatino subbing layer, having a dry thickness of 7.0±0.5 microns. For the thus prepared films, the same tests as in Example 1 were conducted, the results of which are shown in the following tables.

EXAMPLE 10

The procedure as in Example 3 was repeated using the combination of the aqueous dispersion of the vinyl chloride polymer prepared as in Combination 9 of Table 1 and 2,2,4-trimethyl-1,3-pentanediol. The same results were obtained as in Example 3.

We claim:

1. A photographic element comprising a support bearing at least one layer which is the dried residue of a light-sensitive silver halide gelatin emulsion, at least one gelatin layer of said element comprising as additives, to improve the physical properties of said layer, both

| Amount of dispersion of polybutylmethacrylate, ml. | Adhesiveness | | | | | | Dimensional change percentage and humidity expansion coefficient | | |
|---|---|---|---|---|---|---|---|---|---|
| | Amount of trimethylolpropane, g. | Dry state | Immersion state (a) | (b) | (c) | Dry state after processing | Amount of trimethylolpropane, g. | Dimensional change, percent of 200 mm. by processing and drying | Humidity expansion coefficient at 50% RH, $X10^{-5}$ |
| 0 | 0 | 10 | 8 | 8 | 9 | 10 | 0 | 0.023 | 1.65 |
| 0 | 10 | 10 | 8 | 9 | 9 | 10 | 10 | 0.003 | 1.64 |
| 200 | 0 | 10 | 10 | 10 | 10 | 10 | 0 | 0.015 | 1.40 |
| 200 | 10 | 10 | 10 | 10 | 10 | 10 | 10 | 0.007 | 1.37 |

NOTE:
(a) in developer; (b) in fixing solution; (c) in washing water.

(1) an aqueous dispersion of a vinyl polymer, said aqueous dispersion containing as a dispersing agent a compound represneted by the following general formula

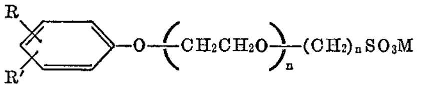

wherein R represents a member selected from the group consisting of a hydrogen atom and an alkyl group having from 1 to 18 carbon atoms, R′ represents an alkyl group having from 1 to 18 carbon atoms, M represents a member selected from the group consisting of an alkali metal and ammonium, *m* is 0 or a positive integer less than 20, and *n* is 3 or 4, and (2) a polyhydroxy compound represented by the following general formula

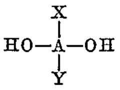

wherein A represents a tetravalent aliphatic hydrocarbon group having from 4 to 10 carbon atoms and X and Y each represents a member selected from the group consisting of a hydrogen atom and a hydroxyl group.

2. The photographic element as claimed in claim 1 wherein the amount of said dispersing agent is from 0.1 to 20% by weight of the vinyl monomer used to form said vinyl polymer.

3. The photographic element as claimed in claim 1 wherein the amount of said dispersing agent is from 3 to 8% by weight of the vinyl monomer used to form said vinyl polymer.

4. The photographic element as claimed in claim 1 wherein said additive containing layer is a silver halide emulsion layer and the amount of said vinyl polymer is from about 10 to 260 g. and the amount of said polyhydroxy compound is from about 5 to 40 g. per one gram molecule of silver halide.

5. The photographic element as claimed in claim 1 wherein said additive containing layer is a protective layer, and the amount of said polymer is from about 30 to 150 g. and the amount of said polyhydroxy compound from about 5 to 20 g. per 60 g. of gelatin.

6. The photographic element as claimed in claim 1 wherein said additive containing layer is an antihalation layer, and the amount of said polymer is from about 30 to 150 g. and the amount of said polyhydroxy compound from about 5 to 20 g. per 60 g. of gelatin.

7. The photographic element as claimed in claim 1 wherein said additive containing layer is a back layer, and the amount of said polymer is from about 30 to 150 g. and the amount of said polyhydroxy compound from about 5 to 20 g. per 60 g. of gelatin.

8. The photographic element as claimed in claim 1 wherein said polymeric aqueous dispersion of the vinyl polymer is prepared by the emulsion polymerization of the vinyl monomer in the presence of said dispersing agent.

9. The photographic element as claimed in claim 5 wherein said vinyl monomer is one selected from the group consisting of acrylic and methacrylic monomers and mixtures thereof.

10. An aqueous silver halide gelatin emulsion for the formation of layers of improved physical properties in photographic elements comprising as additives:

(1) an aqueous dispersion of a vinyl polymer, said aqueous dispersion containing as a dispersing agent a compound represented by the following general formula

wherein in R represents a member selected from the group consisting of a hydrogen atom and an alkyl group having from 1 to 18 carbon atoms, R′ represents an alkyl group having from 1 to 18 carbon atoms, M represents a member selected from the group consisting of an alkali metal and ammonium, *m* is 0 or a positive integer less than 20, and *n* is 3 or 4, and (2) a polyhydroxy compound represented by the following general formula

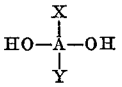

wherein A represents a tetravalent aliphatic hydrocarbon group having from 4 to 10 carbon atoms and X and Y each represents a member selected from the group consisting of a hydrogen atom and a hydroxyl group.

References Cited

UNITED STATES PATENTS

| | | | |
|---|---|---|---|
| 2,960,404 | 11/1960 | Milton et al. | 96—94 |
| 3,017,280 | 1/1962 | Yudelson | 96—114 XR |
| 3,325,286 | 6/1967 | Nottorf | 96—87 |
| 3,415,649 | 12/1968 | Nishio et al. | 96—94 |

RONALD H. SMITH, Primary Examiner

U.S. Cl. X.R.

96—87, 114, 114.4, 114.5